United States Patent [19]
Minarovic

[11] Patent Number: 6,049,279
[45] Date of Patent: Apr. 11, 2000

[54] DETECTABLE TRANSPONDER CONDUIT END CAP

[76] Inventor: Joe T. Minarovic, 201 Logan Ranch Rd., Georgetown, Tex. 78628

[21] Appl. No.: 09/225,157

[22] Filed: Jan. 4, 1999

[51] Int. Cl.[7] .................................................. G08B 13/14
[52] U.S. Cl. .................................... 340/572.8; 340/572.1; 340/572.9; 175/26; 175/40
[58] Field of Search ............................. 340/572.1, 572.8, 340/572.9, 880.02; 175/26, 40

[56] References Cited

U.S. PATENT DOCUMENTS

| | | | |
|---|---|---|---|
| 4,951,758 | 8/1990 | Sonku et al. | 175/40 |
| 5,682,141 | 10/1997 | Morimoto | 340/552 |
| 5,720,354 | 2/1998 | Stump et al. | 175/26 |
| 5,819,859 | 10/1998 | Stump et al. | 175/26 |
| 5,825,303 | 10/1998 | Bloss, Jr. et al. | 340/870.02 |

OTHER PUBLICATIONS

Industrial Technology, OMNI MARKER™ Electronic Marker, "A Better Way to Mark and Relocate Buried Facilities."

*Primary Examiner*—Benjamin C. Lee
*Attorney, Agent, or Firm*—Jack V. Musgrove

[57] ABSTRACT

A transponder conduit end cap includes a transponder housing having two flat, generally parallel walls defining a cavity, a transponder located in the housing, and a fitting which attaches the transponder housing to the end of a conduit, to thereby seal the conduit. The transponder axis is maintained in a predetermined orientation (e.g., vertical), such as by partially filling the cavity with a liquid, and using a buoyant envelope to contain the transponder. Alternatively, the vertical orientation may be maintained by pivotally supporting the transponder from a trunnion attached to an interior of the housing. The transponder can be supported by the trunnion using a loop attached to an end of the transponder, the loop being placed about an annular chamfer of the trunnion to allow spherical articulation. The transponder can be active or passive.

20 Claims, 4 Drawing Sheets

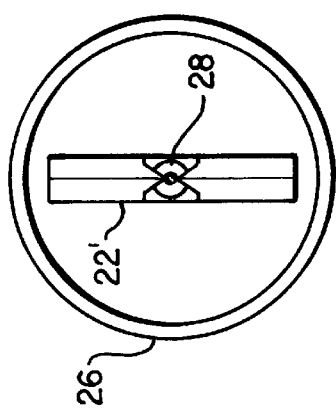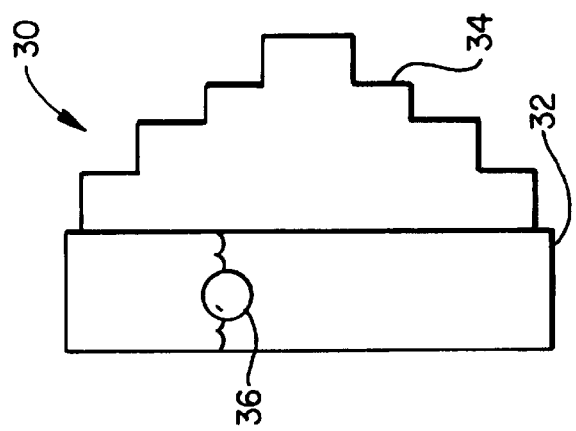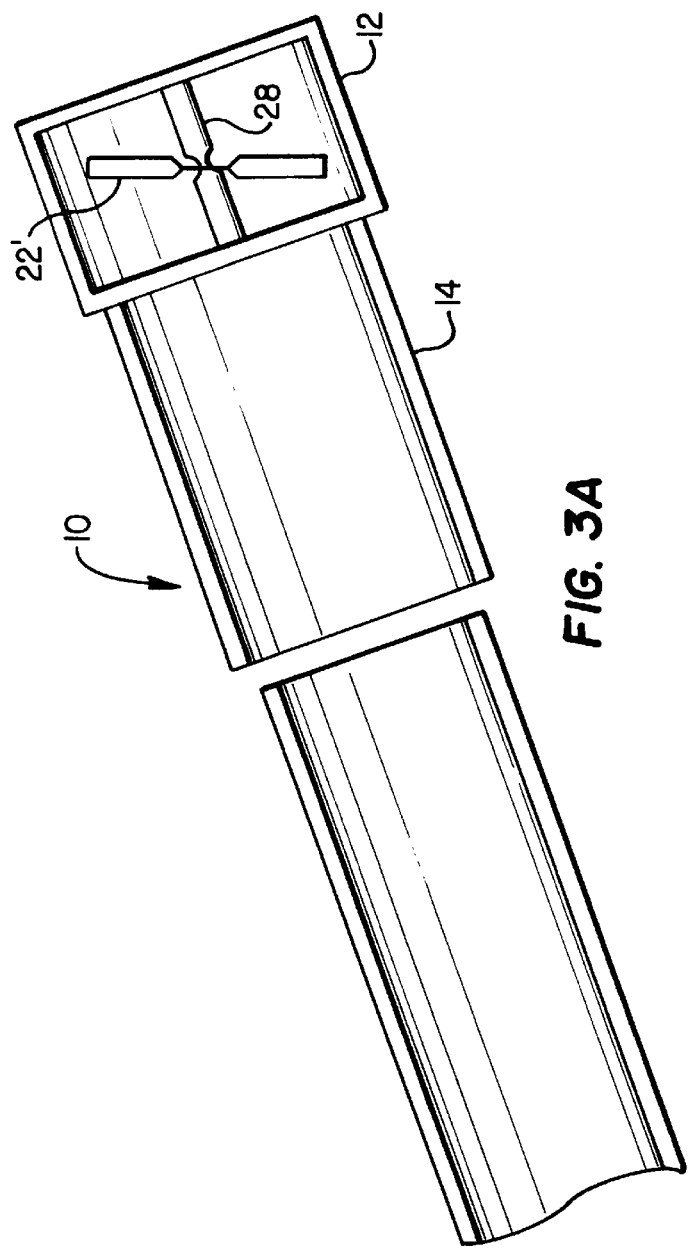
FIG. 3B
FIG. 6
FIG. 3A

DETECTABLE TRANSPONDER CONDUIT END CAP

BACKGROUND OF THE INVENTION

1. Field of the Invention

The present invention generally relates to devices used to electromagnetically mark and locate obscured (buried) objects, and more particularly to a conduit end cap adapted to house a transponder or electronic marker enabling the later location of the non-conductive plastic conduit end using above-ground sensors.

2. Description of Related Art

Buried conduits are employed for supplying a wide variety of utilities, including pipelines for gas, water and sewage, and cables for telephone, optical fiber, power and television. It often becomes necessary to locate the ends of pipe or conduit stubs, in order to connect to new services, main extensions, access points such as cleanouts, branch conduit runs, etc. Conversely, is important to know with as much accuracy as possible, the approximate vicinity of the previously described application types in order to avoid disturbing them when digging or excavating for other purposes. Above ground marking devices may be installed after they are buried but they are often lost, stolen, or destroyed after a short period of use. Therefore, it is common to use underground marking devices or systems to enable the later location of a lost section or feature of an underground utility.

In the past, three different below ground approaches have been used to indicate the presence of ends of conduits, namely, warning tape, trace wires, trace wire, other conductors, and electronic marker systems. A warning tape is simply a band of plastic which is placed above the conduit before burial. These tapes are used to alert the excavation team of the presence of the conduit before any damage thereto might occur. As the backhoe or other mechanical digger excavates the site, it will hopefully uproot a portion of the warning tape prior to contact with the conduit. The primary disadvantage of (non-metallic) warning tapes is that they cannot easily be detected by any surface instrumentation.

A single trace wire is sometimes buried with a utility line. The trace wire is used as a conductor for an AC signal which is applied to the wire at one accessible end, and then acts as an antenna and radiates an electromagnetic field above ground along its entire length. The electromagnetic field may be detected with an appropriate receiver, and the underground path of the line thereby determined. The earliest cable locators used a single sensor which detects a single null or peak (depending upon the orientation of the sensor) as the unit passes near the cable. Many later devices use two or more sensors that combine the signals to provide an indication of conductor proximity. The most common sensors are ferrite-core antennas, i.e., inductors. Although the conduit itself may act as a conductor (i.e., when steel pipe or copper wire cabling is used), most conduits are non-conductive and therefore require a trace wire. There are three significant disadvantages in the use of a trace wire. First of all, it is necessary to provide above ground access to the trace wire in order to couple the AC signal thereto. Secondly, if a break occurs in the wire (due to excavation, or natural causes such as corrosion, earth movement or burrowing animals), then the wire becomes useless. Finally, the trace wire is too thin to imprint a warning message thereon, precluding any visual warning. Additionally, a receiver cannot easily distinguish the trace wire from any other conductor in the vicinity.

Electronic marker systems for locating buried objects are known in the art, and generally consist of two types, namely, active and passive markers (transponders). Active markers require the use of a power supply which amplifies a signal source (usually an AC signal). The signal is radiated by the underground marker and detected by a receiver unit above ground. Passive markers, in contrast, have no power supply, but rather operate in a resonant mode, responsive to a transmitted electromagnetic field.

A passive marker is basically a wire coil and capacitor surrounded in a protective envelope, which is then buried adjacent to the cable, pipe, or other object to be located. The marker is self-contained, with no external, accessible connections. Passive markers are activated by radiating a signal into the ground in the area where the marker is expected to be found. The signal is emitted via an inductive coil held close to the surface (the transmitter portion of a transceiver). When the coil is directly over, or near, the passive marker (which is itself an inductive coil), the marker accepts energy within its bandpass and stores it, reaching a sustained amplitude during the transmission cycle. When the transmission cycle ends, the marker re-emits the energy at the marker's resonant frequency with an exponentially decaying amplitude. A second coil within the transceiver unit acts as a receiving antenna which detects the re-radiated energy, alerting the locating technician with an audible tone or other indicator means.

FIG. 1 illustrates several kinds of passive transponders for different applications. These include a small, near-surface marker 2 for locating a valve box, a medium size or mid-range marker 4 for locating a service drop (a loose coil of cabling deployed for future use), a full-range marker 6 for locating a more deeply buried conduit stub, and a so-called ball marker 8 for locating a conduit tee. The latter marker provides a spherical housing which supports the marker coil horizontally, regardless of the orientation of the housing (i.e., self-leveling), and is used for soil conditions which may result in significant shifting of the housing, such that the marker always provides a vertical location beacon (inductor axis).

Electronic markers, as well as warning tapes, are usually color-coded according to the particular type of utility line they mark. Specifically, gas line markers are yellow; telephone cable markers are orange; waste water tunnel markers are green; water pipe markers are blue; and power supply markers are red. Similarly, the passive marker is "coded" by tuning the coil for a specific resonant frequency. Five distinct frequencies have been designated: 83.0 kHz for gas; 101.4 kHz for telephone; 121.6 kHz for sewage; 145.7 kHz for water; and 169.8 kHz for power. In this manner, a locating technician searching for, say, a gas line, cannot accidentally activate a telephone marker since his transmitter will only be sending out an 83 kHz signal, which is not within the bandwidth for a telephone marker tuned for 101.4 kHz. Of course, these frequencies have been designated by convention, and are not meant to be restrictive.

There are hybrid systems wherein, for example, a signal is applied to a buried conductor (cable or trace wire), and coupled through the conductor to one or more markers buried adjacent the conductor. Also, a marker can be used to couple one conductor to another, so that the test signal may be conveyed to the second conductor without a direct physical connection.

While passive electronic markers have several advantages over warning tapes and tracing wires, they are still subject to certain limitations, primarily related to the desired resonant frequency of a particular marker. In a prior art marker, which is essentially an LC circuit, the resonant frequency f is given by the equation $f=1/(2\pi\sqrt{LC})$ where L is the inductance of the wire coil and C is the capacitance of the capacitor. This frequency must be closely controlled in order to adhere to the foregoing tuning conventions and to provide a return signal of maximum amplitude; however, the actual frequency is affected by component construction, manufacturing tolerances, operating temperature, aging, placement and other factors.

One problem associated with using passive or active transponders for remote identification of buried utility structures is that, as alluded to regarding ball marker 8, the transponder must be properly oriented to maintain the coil axis in a generally vertical position. Current methods for locating service drops are highly dependent on field crews for correct placement of transponders for accurate locating. Even with correct placement procedures, movement can occur in a filled ditch or hole as a result of loose unpacked soil, freeze/thaw cycling, water erosion, and other causes. If the coil axis orientation deviates from the vertical, then the craftsperson searching for the marker will sense a peak signal at a position which does not correspond to the buried transponder, resulting in a mislocate, which can be costly if the excavation equipment damages any part of the underground utility due to the error. Although markers can be attached to the utility structure in the proper orientation using clamps, straps, tape, adhesive, etc., subsurface movement can still result in angular displacement of the markers. Also, initial placement of the markers requires careful use of tools such as levels, transits or plumb bobs.

While ball marker 8 overcomes this problem, it still has certain disadvantages. For example, the spherical design of the ball marker prevents its use in narrow spaces, such plow-in ditches. Furthermore, while angular displacement of the coil axis is avoided, there is still the possibility of translational movement of the housing itself, as the ball marker is not attached to the buried conduit. Such movement is especially troublesome when marking a specific point, such as a conduit end, as opposed to simply marking a portion of the length of the conduit. It would, therefore, be desirable to devise an improved method of accurately locating a conduit end without dependency on craft skill. It would be further advantageous if the method allowed the marker to be affixed to the buried conduit.

SUMMARY OF THE INVENTION

It is therefore one object of the present invention to provide an improved method of deploying an electronic transponder used to locate a buried or otherwise obscured object.

It is another object of the present invention to provide such a method that allows accurate orientation of the transponder axis without requiring craft skill.

It is yet another object of the present invention to provide an article which can be used to achieve such accurate orientation of the transponder, and be conveniently affixed to the conduit end in an advantageous manner.

The foregoing objects are achieved in a device for electronically marking a buried object, generally comprising a housing including two flat, generally parallel walls defining a cavity, a transponder located in the housing, means for maintaining the transponder in a predetermined orientation, and means for attaching the housing to the obscured structure. The cavity may be partially filled with a liquid, and in such case the maintaining means includes a buoyant envelope containing the transponder. The attaching means may advantageously attach the housing to an end of the conduit to thereby seal the conduit, and may include a fitting having a plurality of annular steps with different diameters, adapted to seal conduits of different sizes. Alternatively, the fitting may simply be generally tubular, to accommodate a single size of cylindrical conduit.

The transponder can include an inductor coil having an axis, and the maintaining means may maintain the coil axis in a vertical orientation. This orientation may be maintained by pivotally supported the transponder from a trunnion attached to an interior of the housing. The transponder can be supported by the trunnion using a loop attached to an end of the transponder, the loop being placed about the trunnion. The trunnion may be designed with an annular chamfer to allow the transponder to swing with spherical articulation. The transponder can be active or passive.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIGS. 3A and 3B are longitudinal and axial cross-sections of an alternative embodiment of the detectable transponder conduit cap of the present invention;

FIG. 6 is a longitudinal cross-section of a further embodiment of the transponder conduit cap of the present invention.

DESCRIPTION OF AN ILLUSTRATIVE EMBODIMENT

Figure 1:
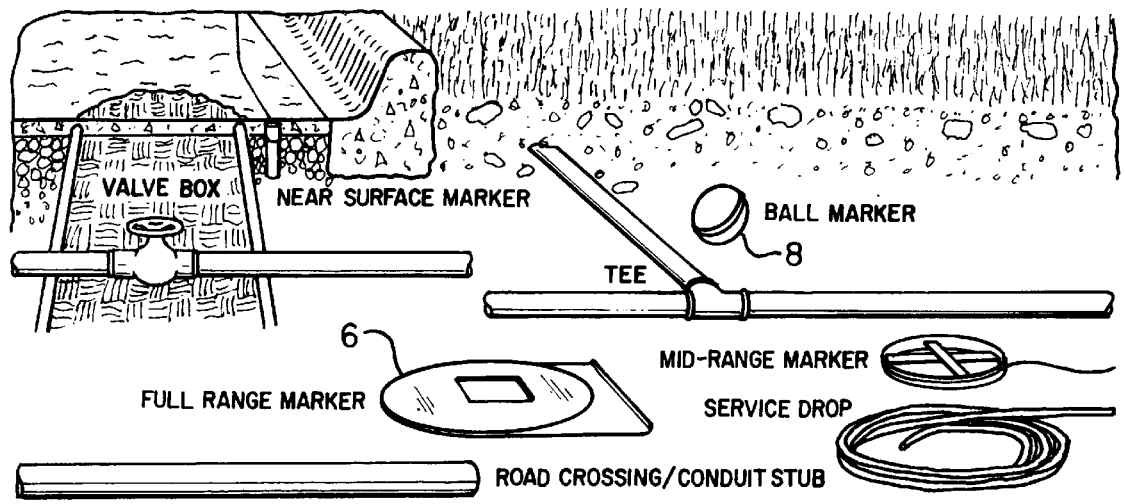
FIG. 1 is a pictorial representation of various underground utility structures which have been marked with electronic transponders to allow conventional location of the structures.
Figure 2:
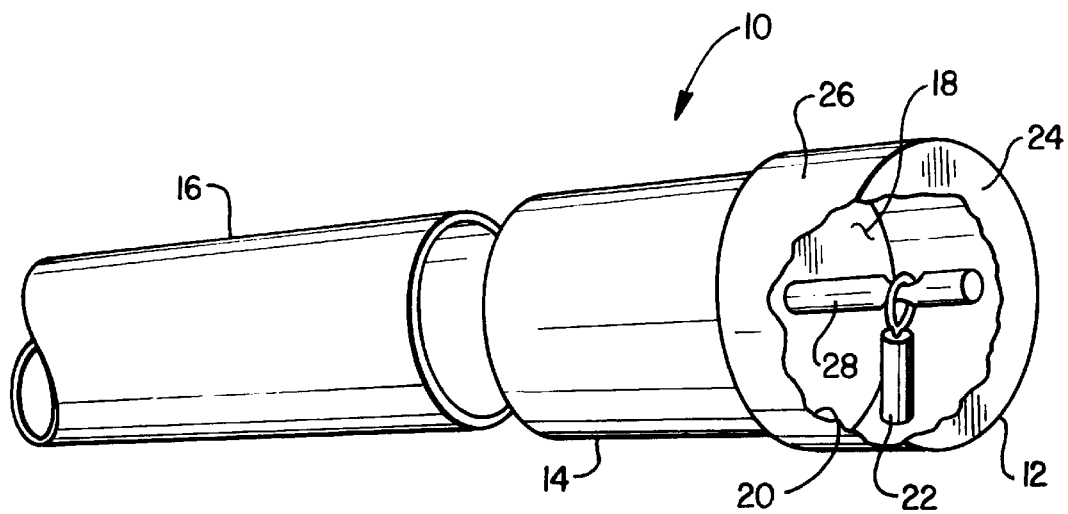
FIG. 2 is a perspective view of one embodiment of the detectable transponder conduit cap of the present invention shown with a portion of the conduit cap cut away.

With reference now to the figures, and in particular with reference to FIG. 2, there is depicted one embodiment of a detectable transponder conduit cap 10 constructed in accordance with the present invention. Transponder conduit cap 10 is generally comprised of a transponder housing 12 and an end cap or fitting 14. As explained further below, transponder conduit cap 10 is used to locate the end of a conduit 16 after it has been buried, but transponder conduit cap 10 provides the further function of preventing the fluid in the conduit (e.g., natural gas, potable water, or sewage) from escaping the conduit or, in the case of a non-functional (open) conduit, preventing ground water or other contaminants from entering the conduit.

Fitting 14 is dimensioned to provide a tight fit with the end portion of conduit 16, and can be joined to the conduit end by a variety of methods, such as adhesives, fusion bonding, etc. In the illustrated embodiment, fitting 14 is generally tubular (cylindrical). A flat wall 18 is formed at one end of the cylinder to close off or seal the conduit. Wall 18 also serves to define, in part, a cavity 20 within transponder housing 12. Cavity 20 contains a transponder 22 which is used for electronic location, as discussed further below. The shape of transponder housing 12 is preferably selected to generally match that of conduit 16 and fitting 14, and includes an outer flat wall 24 that further defines cavity 20 along with a cylindrical wall 26. Fitting 14 and transponder housing 12 may be constructed of any durable material, preferably a polymer such as polyester or high-density polyethylene, or some polymeric blend.

Transponder 22 may be passive, constructed using a capacitor connected to an inductor formed by a coil of wire. The capacitor and wire coil may be contained in a protective envelope which is then secured within the enclosed cylinder. Transponder housing 12 is designed to retain transponder 22 in such a manner that the transponder (coil) axis is generally vertical regardless of the angular orientation of transponder end cap 10 once it is placed on the end of conduit 16. As shown by the cut away portion of FIG. 2, in this embodiment transponder 22 is so retained by providing an axle or trunnion 28 which pivotally supports transponder 22 by means of a small loop of string or wire attached to one end of transponder 22, and placed about trunnion 28. The length of transponder 22 is greater than the inner width (thickness) of transponder housing 12. This construction avoids the problem noted in the Background relating to proper vertical orientation of the marker axis. A conventional transceiver may be used to detect and locate the transponder after it has been buried.

Since conduit is generally laid in the ground horizontally, the orientation of trunnion 28 is likewise horizontal, meaning that transponder 22 will not only appear vertically oriented from the front of transponder end cap 10, but will further appear vertically oriented from the side of transponder end cap 10. However, it is possible that the orientation of the conduit itself will vary from the horizontal, either due to shifting of the conduit after burial, or due to intentional skewed placement to allow flow of fluid between two points having different elevations. In such cases, it is advantageous to design transponder housing 12 such that another degree of mechanical freedom is imparted to the support of transponder 22, to ensure that its orientation still remains generally vertical as viewed from the side of transponder end cap 10. Such a design may be provided by forming an annular groove or chamfer in a portion of trunnion 28 which allows transponder 22 to swing with spherical articulation.

The chamfered portion of trunnion 28 is further seen in FIG. 3A, which illustrates the added degree of freedom. In FIGS. 3A and 3B, an alternative transponder 22' is used which is two-piece. One piece is slightly longer (and thus heavier) than the other, to keep transponder 22' plumb (vertically balanced). The chamfer also serves to maintain the transponder near the center of cavity 20. This construction keeps the transponder vertical from a side view (FIG. 3A) as well as from the front (FIG. 3B).

Figure 4B:
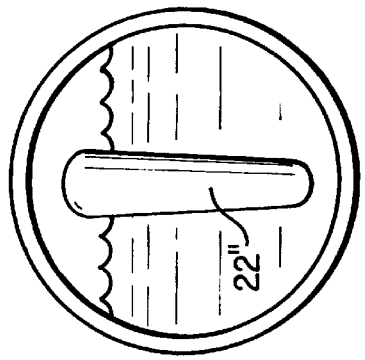
FIGS. 4A and 4B are longitudinal and axial cross-sections of another alternative embodiment of the detectable transponder conduit cap of the present invention.
Figure 4A:
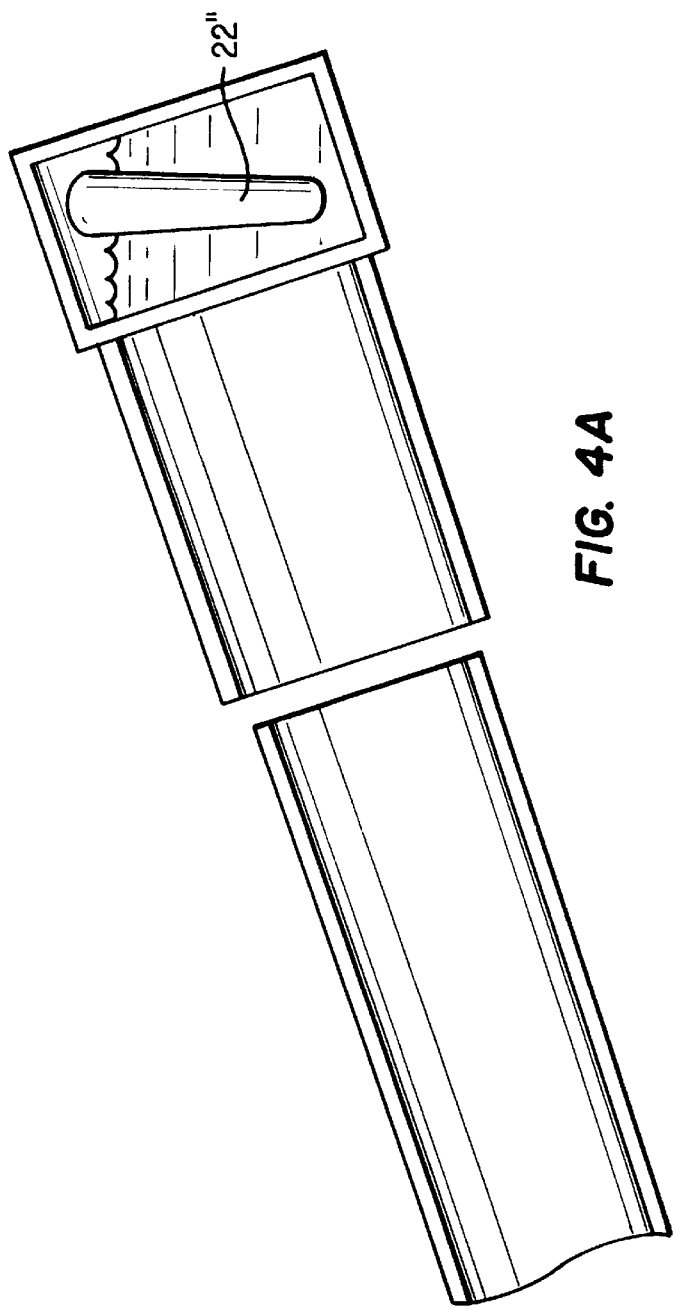

Alternative positioning of a ferrite core or air core transponder within transponder housing 12 may be achieved by filling a portion of cavity 20 with a suspension media, particularly a liquid (e.g., water), and packaging the transponder in a buoyant envelope. Such a modified transponder 22" is shown in FIGS. 4A and 4B. The buoyancy of transponder 22" provides the verticality of the transponder axis. Those skilled in the art will also appreciate that other means may be used to provide self-leveling of a transponder, such as a gimble mounted within transponder housing 12.

In each of the foregoing designs, the transponder is not only isolated, or accurately positioned, with respect to the longitudinal axis, but further provides a separation distance to reduce electromagnetic influence that adjacent metallic structures of the buried utility might otherwise cause during detection of the transponder, which would diminish the available reflective energy used for above-ground detection and locating. It is particularly advantageous that the transponder has been incorporated into the conduit itself. Although the foregoing embodiments show a single (common) wall 18 between fitting 14 and transponder housing 12, these two pieces could be constructed with separate walls which are then attached together (using adhesives, fusion bonding, etc.).

Figure 5A:
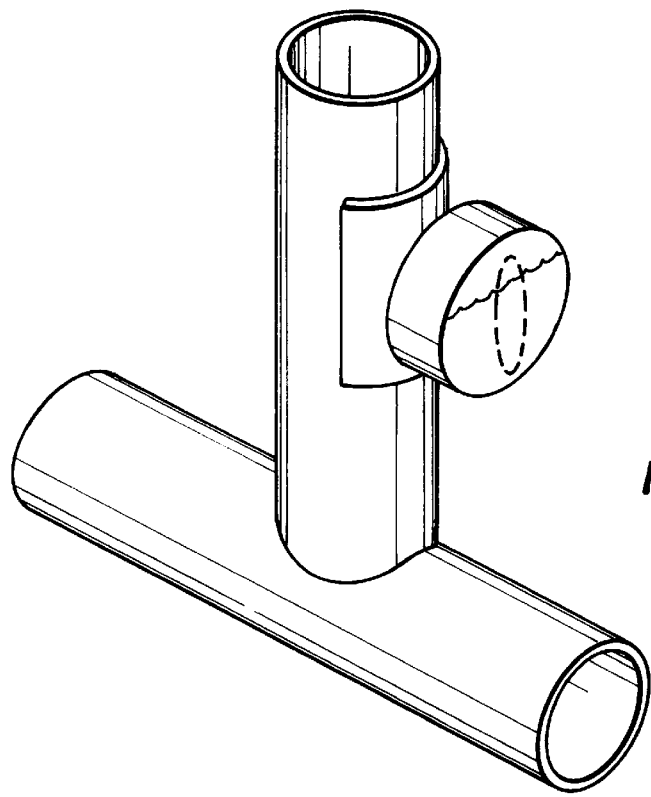
FIGS. 5A–5C are perspective views illustrating how a conduit cap constructed in accordance with the present invention may be alternatively affixed to a conduit.
Figure 5B:
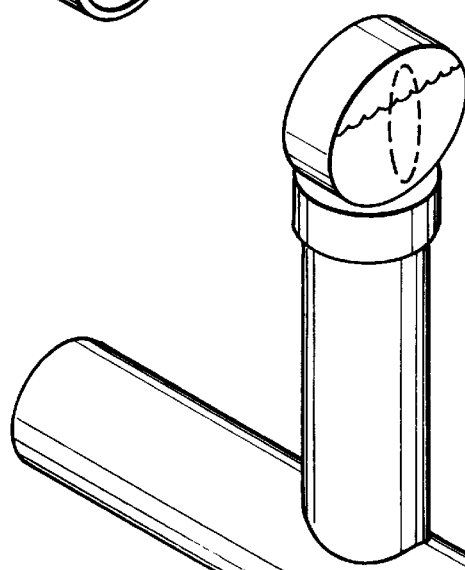
Figure 5C:
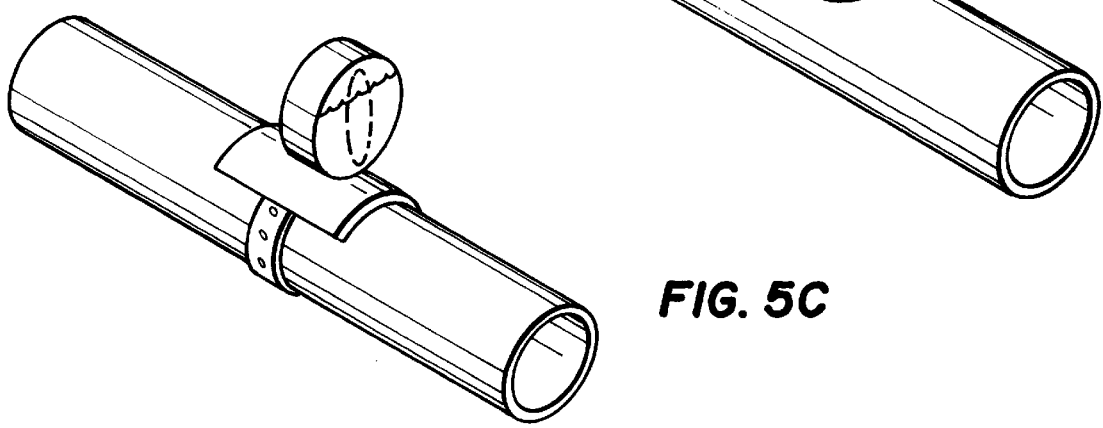

Other variations in the deployment of the transponder are possible. For example, the transponder housing may be mounted differently onto the conduit. FIGS. 5A–5C illustrate such variations. In FIG. 5A, housing 12 has been mounted to the side of a vertically disposed portion of conduit. In FIG. 5B, housing 12 is again incorporated into an end cap, which fits over the end of the vertically disposed conduit. In that embodiment, the orientation of housing 12 is thus orthogonal to the end wall of the conduit fitting. In FIG. 5C, housing 12 is mounted along the upper ridge of the conduit, illustrating the versatility of the design.

As previously noted, the shape of the transponder end cap may vary according to the dimensions of the conduit being capped/marked. A design for an alternative transponder end cap 30 is shown in FIG. 6, which is adapted to mate with conduits of different sizes. Transponder end cap 30 includes a transponder housing 32 which is generally similar to transponder housing 12, and a different fitting portion 34. Fitting 34 has a series of annular steps or rings, decreasing in diameter moving away from transponder housing 32. The diameters may be selected based on common conduit sizes, such as iron pipe size, copper tubing size, or metric. In this manner, a single design for the transponder end cap may be used to accommodate many different types of conduit. FIG. 6 also depicts an alternative transponder 36 which floats horizontally, rather than vertically (and thus uses peak-null-peak detection, rather than null-peak-null detection). The embodiment of FIG. 6 is adapted to fit within the inner diameter of the conduit, but another embodiment can provide an outer fitting with annular steps increasing in diameter moving away from the transponder housing.

While the foregoing description contemplates a passive transponder, the invention could alternatively use an active (i.e., battery-powered), multifunction transponder.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

I claim:

1. An article for marking an obscured conduit, comprising:
    a housing having a cavity;
    a transponder located in said housing;
    means for maintaining said transponder in a predetermined orientation; and means for attaching said housing to an end of the conduit and thereby seal the end of the conduit.

2. The article of claim 1 wherein said attaching means comprises a fitting having a plurality of annular steps with different diameters, and adapted to seal conduits of different sizes.

3. The article of claim 1 wherein said attaching means includes a generally cylindrical fitting.

4. The article of claim 1 wherein said transponder is a passive transponder.

5. The article of claim 4 wherein said passive transponder is a ferrite core inductor.

6. An article for marking an obscured conduit, comprising:
   a housing including two flat, generally parallel walls defining a cavity;
   a transponder located in said housing;
   means for maintaining said transponder in a predetermined orientation; and
   means for attaching said housing to the obscured conduit.

7. The article of claim 6 wherein:
   said cavity is partially filled with a suspension media; and
   said maintaining means includes a buoyant envelope containing said transponder.

8. The article of claim 6 wherein said attaching means attaches said housing to an end of the conduit and thereby seals the end of the conduit.

9. The article of claim 8 wherein said attaching means comprises a fitting having a plurality of annular steps with different diameters, and adapted to seal conduits of different sizes.

10. The article of claim 6 wherein said attaching means includes a generally cylindrical fitting.

11. The article of claim 10 wherein said cylindrical fitting has an end wall, and said parallel walls of said housing are disposed orthogonal to said end wall of said fitting.

12. The article of claim 6 wherein:
   said transponder includes an inductor coil having an axis; and
   said maintaining means maintains said coil axis in a vertical orientation.

13. The article of claim 12 wherein said transponder is pivotally supported by a trunnion attached to an interior of said housing.

14. The article of claim 13 wherein said transponder is supported by said trunnion using a loop attached to an end of said transponder, said loop being placed about said trunnion.

15. The article of claim 13 wherein said trunnion further has an annular chamfer to allow said transponder to swing with spherical articulation.

16. The article of claim 6 wherein said transponder is a passive transponder.

17. The article of claim 16 wherein said passive transponder is a ferrite core inductor.

18. An article for marking an obscured conduit, comprising:
   a housing including two flat, generally parallel walls defining a cavity;
   a transponder located in said housing, said transponder being generally elongate and including a coil having an axis parallel with a length direction of said transponder, with said axis disposed generally parallel to said housing walls; and
   means for maintaining said transponder in a predetermined orientation.

19. The article of claim 18 wherein said transponder has a length which is greater than a width of said cavity.

20. The article of claim 18 wherein:
   said cavity is partially filled with a suspension media; and
   said maintaining means includes a buoyant envelope containing said transponder.

* * * * *